United States Patent [19]

Klatt et al.

[11] 4,122,311

[45] Oct. 24, 1978

[54] ELECTRONIC MULTIPLEXER FOR PARALLEL, BI-DIRECTIONAL SCANNING THERMAL IMAGING SYSTEM

[75] Inventors: Robert W. Klatt; Preben B. Jensen, both of Rancho Palos Verdes, Calif.

[73] Assignee: Hughes Aircraft Company, Culver City, Calif.

[21] Appl. No.: 841,612

[22] Filed: Oct. 13, 1977

[51] Int. Cl.² ............................................. H03K 17/04
[52] U.S. Cl. .................................. 179/15 BL; 178/50
[58] Field of Search ..................... H04J/3/04; 178/50; 179/15 BL, 15 A; 340/182

[56] References Cited

U.S. PATENT DOCUMENTS

| | | | |
|---|---|---|---|
| 3,427,475 | 2/1969 | Wilkinson et al. | 179/15 BL |
| 3,581,017 | 5/1971 | Stevens et al. | 179/15 BL |
| 4,017,687 | 4/1977 | Hartzler et al. | 179/15 BL |

*Primary Examiner*—Thomas A. Robinson

*Attorney, Agent, or Firm*—Lawrence V. Link, Jr.; W. H. MacAllister

[57] ABSTRACT

A system for generating a serial video signal from a plurality of parallel channels particularly useful in thermal imaging systems incorporating bi-directional scanning. Signals on parallel input lines are simultaneously sampled and held by individual sample and hold circuits in each channel. A first multiplex level having a plurality of slow multiplexers is arranged so that each slow multiplexer selects a subset of the total number of analog inputs to generate a serial output from each slow multiplexer. Each such single output is coupled to a high speed gate in a fast multiplexer to generate a serial output from a single output channel. The fast multiplexers operate at a rate determined by the output scan time divided by the number of parallel input channels. The slow multiplexers operate at a fraction of this speed where the fraction is equivalent to one over the number of slow multiplexers generating an input to the fast multiplexer.

3 Claims, 8 Drawing Figures

ELECTRONIC MULTIPLEXER FOR PARALLEL, BI-DIRECTIONAL SCANNING THERMAL IMAGING SYSTEM

The invention herein described was made in the course of or under a contract or subcontract thereunder with the Department of the Army.

BACKGROUND OF THE INVENTION

The present invention relates to multiplexing a plurality of analog signals onto a single output channel and particularly relates to a multiplexer useful in generating a serial video signal from a plurality of parallel bi-directional scanning thermal imaging sensors without the requirement of using a vidicon or other electro-optical transducers.

Thermal imaging systems are experiencing wider application and development for many reasons including the ability of such systems to form images without the aid of visible light. In one particular example of a thermal imaging system, a picture is constructed by causing a column of IR detectors to scan across an observation scene. In many applications, this scanning is accomplished utilizing a mirror which first scans in one direction and then scans back in the return direction in alternate interleaved scanning positions to form one entire picture for each such bi-directional scan. The picture must then be transformed from the IR frequency range to the visible spectrum so that it may be observed. This has been accomplished in prior systems by utilizing the signals from the IR detectors to activate a column of light emitting diodes which are arranged to transmit the generated light to the back face mirror which is also a reflective surface. The reflective back surface of the mirror is then observed by the system operator. However, substantial difficulties arise in such systems when more than one observer must observe the scene. In such systems, complex optical devices including mirrors, prisms, etc. which involve complex alignment problems have been utilized. In addition, vidicons or other electro-optical transducers have been required which have further increased the complexity of such systems.

Although these electro-mechanical problems and complexities exist, an all-electronic display system which utilizes CRTs or other electronic display medium has also raised problems. One difficulty, particularly apparent in bi-directional scanning systems, is that in order to convert the plurality of video signals appearing on the parallel channels from the IR detectors, it is necessary to convert these parallel signals into a single, serial video signal which is required in order to incorporate a CRT display. Conventional parallel-to-serial multiplexers are not acceptable particularly when the system utilizes bi-directional scanning in an interlaced line scanning and display system, because the scanning is continuous and all of the video input channels cannot be outputted simultaneously and still be serial in nature. Consequently, each of the video samples in the conventional arrangement is outputted serially on the single output line at a slightly different time and thus represents a slightly different look angle for the detector column. The resultant picture thus appears slightly skewed. Such skewing becomes a particular problem in bi-directional scanning because the slant occurs in one direction for one direction of scanning and in the opposite direction for the opposite direction of scanning resulting in substantial distortion in the resultant CRT picture.

The present invention alleviates these problems by providing a novel multiplexer which has particular use in bi-directional scanning thermal imaging systems.

SUMMARY OF THE INVENTION

The present invention may be most easily understood by reference to the 120 video channel example described hereafter. It will be appreciated, however, that the specific number of video parallel channels is unimportant and does not limit the scope of the present invention. Initially, 120 analog video signals are generated, for example, by a vertical row of 120 IR sensors which scan horizontally across a scene. The analog video signals are first coupled to sample-and-hold circuitry which comprises 120 individual sample-and-hold circuits, one for each channel, whereby the analog video signals are sampled in response to a common gate signal and the resultant voltage levels existing at the sample time are held until the next sampling gate signal occurs. This sampling of the signals from the vertical row of sensors occurs at discrete times as the generally continuous scanning proceeds so that the 120 sampled signals correspond to a single display line. It will be appreciated that the analog video signal varies slowly compared to the sampling rate and that the analog signal will thus be substantially constant during the sample time.

Slow multiplexing circuitry is then provided to receive the output signals from the sample and hold circuitry. In the illustrative embodiment, six slow multiplexers are oriented to be coupled to six subsets of inputs each comprising twenty video output channels from the sample-and-hold circuitry. Each such slow multiplexer comprises twenty switching circuits which turn on and off in response to gate signals and whose outputs are coupled to form a single sample output for each multiplexer. The gate signals cause the signal level, held by each of the twenty sample and hold circuitry outputs to be sequentially gated through the particular slow multiplexer to sequentially appear at the sample slow multiplexer output.

While any desired sequence of gating the samples from the various analog channels through the multiplexer may be implemented, it will generally be preferable to output the 120 video signals starting with video channel one and continuing sequentially through to video channel 120. Whatever the sequence, however, the subsets of sample and hold channels are coupled to each of the slow multiplexers in such a way that each slow multiplexer gates one sample and hold circuitry output channel before any slow multiplexer gates a second sample-and-hold circuitry output channel and no more than one signal sample will appear at the output of any given slow multiplexer at any time. The sequential outputs from the slow multiplexers are then coupled to a fast multiplexer comprising six high speed switches whose outputs are coupled to form one single output channel. The fast multiplexer sequentially samples each slow multiplexer output while that particular slow multiplexer is enabling one of the sample-and-hold outputs at a time when the signal sample is available at the output of the slow multiplexer in question. The switching of the slow multiplexers to sequentially enable the signals from the individual channels of the sample-and-hold circuit may be accomplished by simply delaying an enable clock pulse with a series of flip-flops in each slow multiplexer circuit. Thus, the sampled analog signal from the particular video channel sought to be outputted is simultaneously gated through the particular slow multiplexer in question and a high speed gate of the fast multiplexer to appear at the single output of the fast multiplexer during the time when the fast multiplexer gate is turned on.

Appropriate timing circuitry is coupled to the slow multiplexer circuits and the fast multiplexer to synchronize the various switches so that the 120 video signals sampled and held in the sample-and-hold circuitry will appear as a serial stream of samples having a voltage equal to the value of analog signal held by the sample-and-hold circuitry.

It is thus the general object of the present invention to provide a unique parallel-to-serial multiplexer.

Yet another object of the present invention is to provide a multiplexer for a thermal imaging system having bi-directional scanning whereby the output may be displayed on a CRT.

Yet another object of the present invention is to provide a multiplexer to facilitate viewing a thermal image scene by providing a different CRT display for each observer.

Still another object of the present invention is to provide a multiplexer which utilizes a minimum number of high speed switches to thereby minimize size, weight, cost, and power consumption of a multiplexer circuit.

Still another object of the present invention is to provide a multiplexer which eliminates distortion caused by a continuous scanning system.

BRIEF DESCRIPTION OF THE DRAWINGS

These and other objects, advantages and features of the present invention will be more fully apparent from the detailed description below taken with the accompanying drawings in which like reference characters refer to like parts throughout and wherein.

DETAILED DESCRIPTION OF THE PREFERRED EMBODIMENTS

Figure 1:
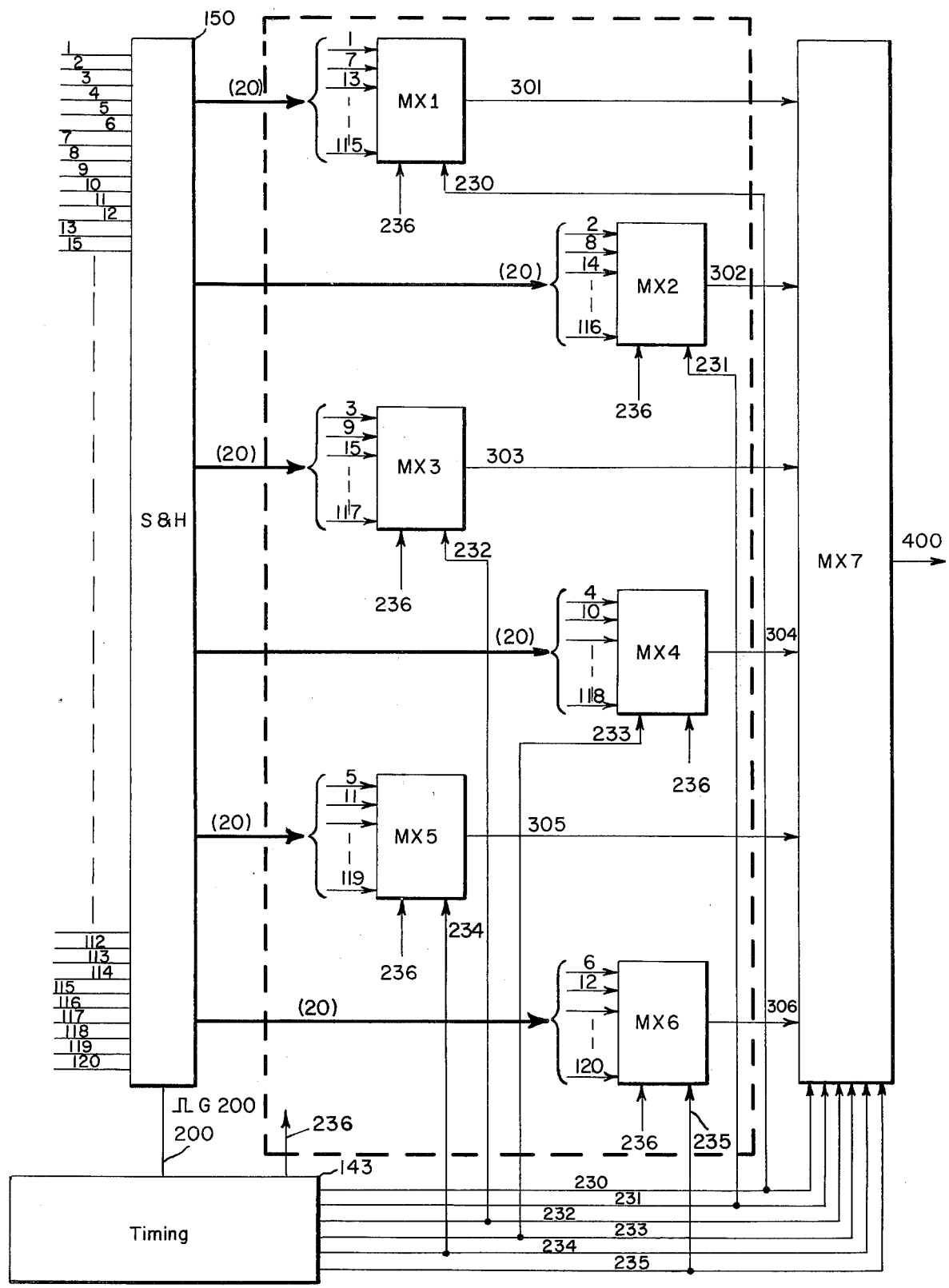
FIG. 1 is a generalized block diagram illustrating the various interconnections of the present invention.

In the illustrated embodiment of FIG. 1, 120 video input leads identified as interconnects 1, 2...120, from 120 individual analog signal generating sources such as IR detectors, (not shown), are connected as inputs to a sample-and-hold circuit 150 which simultaneously samples all 120 analog signals at discrete times and holds the result until the next discrete sample time. For example, the data from each discrete sample time may represent the data that will be presented on a single line of a TV type display. As previously mentioned, the simultaneous sampling of all 120 input lines is done to prevent distortion in bi-directional scanning systems which first scan alternate vertical or horizontal lines in one direction and then scan the remaining interleaved lines in the opposite direction. A timing means 143 supplies the sample gating signal along an interconnection 200. Of course, it will be appreciated that any number of video signals may be coupled into the sample-and-hold means 150 without departing from the spirit of the present invention.

Figure 3:
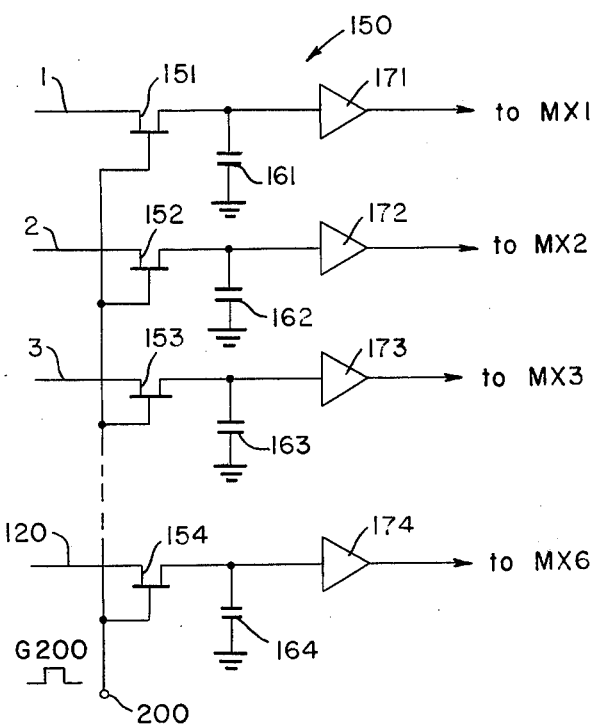
FIG. 3 is a detailed circuit diagram showing an illustrative embodiment of typical sample-and-hold circuitry.

The sample-and-hold circuit 150 may be implemented as illustrated in FIG. 3 where each video input channel is shown comprising a switch, a capacitor and amplifier. By way of illustration, an input channel 1 is coupled to the input lead of a switch 151. The base of the switch 151 is coupled to the interconnection 200 from a timing means 143 and provides the gate signal G200 to turn the switch 151 either on or off. Coupled between the output of the switch 151 and ground is a capacitor 161 which provides the holding or storage function of the sample-and-hold circuit. In one preferred embodiment in which there are 2,000 sweep lines per picture with thirty pictures displayed each second, the required storage or holding capability may be obtained utilizing a capacitor on the order of 100 pf.

Also coupled to the output of the switch 151 is an amplifier 171 to provide the necessary signal strength to a multiplexer MX1. Similarly, in channel 2, a switch 152 is coupled to a capacitor 162 and an amplifier 172 to supply the necessary signal to a multiplex means MX2. The above described sample-and-hold circuit is then repeated for each of the input channels (120 in the present illustrative example) with the simultaneous sampling provision provided by interconnection 200 which is coupled to each switch in the sample-and-hold circuitry to provide the sample gate signal simultaneously to all channels. The switches in the sample and hold circuit may be any suitable switching devices such as n-channel field-effect transistors as illustrated in FIG. 3.

The outputs from the sample-and-hold circuit 150 are next coupled to a slow multiplexing means which in the particular embodiment illustrated comprises six slow multiplexers MX1, MX2, MX3, MX4, MX5, and MX6. While the output from any given video channel from the sample-and-hold circuit 150 may be interconnected to any one of the above-identified slow multiplexers to obtain any particular sequence of sampling desired, in most applications it will be desired to sequentially sample first channel 1 then channel 2, and so forth through channel 120. In order to obtain such a sampling sequence, output channels 1, 7, 13 . . . 115 are coupled to slow multiplexer MX1; output channels 2, 8, 14 . . . 116 are coupled to slow multiplexer MX2; output channels 3, 9, 15 . . . 117 are coupled to slow multiplexer MX3; output channels 4, 10, 16 . . . 118 are coupled to slow multiplexer MX4; output channels 5, 11, 17 . . . 119 are coupled to multiplexer MX5; and output channels 6, 12, 18 . . . 120 are coupled to multiplexer MX6. A gate enable signal G236 is supplied to each of the above-identified slow multiplexers along an interconnection 236. Also coupled as an input to the respective multiplexers are gate signal interconnections 230, 231, 232, 233, 234, and 235 which respectively provide the gate signals G230, G231, G232, G233, G234 and G235 (see FIG. 2) to commence the multiplexing process in the respective multiplexers.

Figure 4:
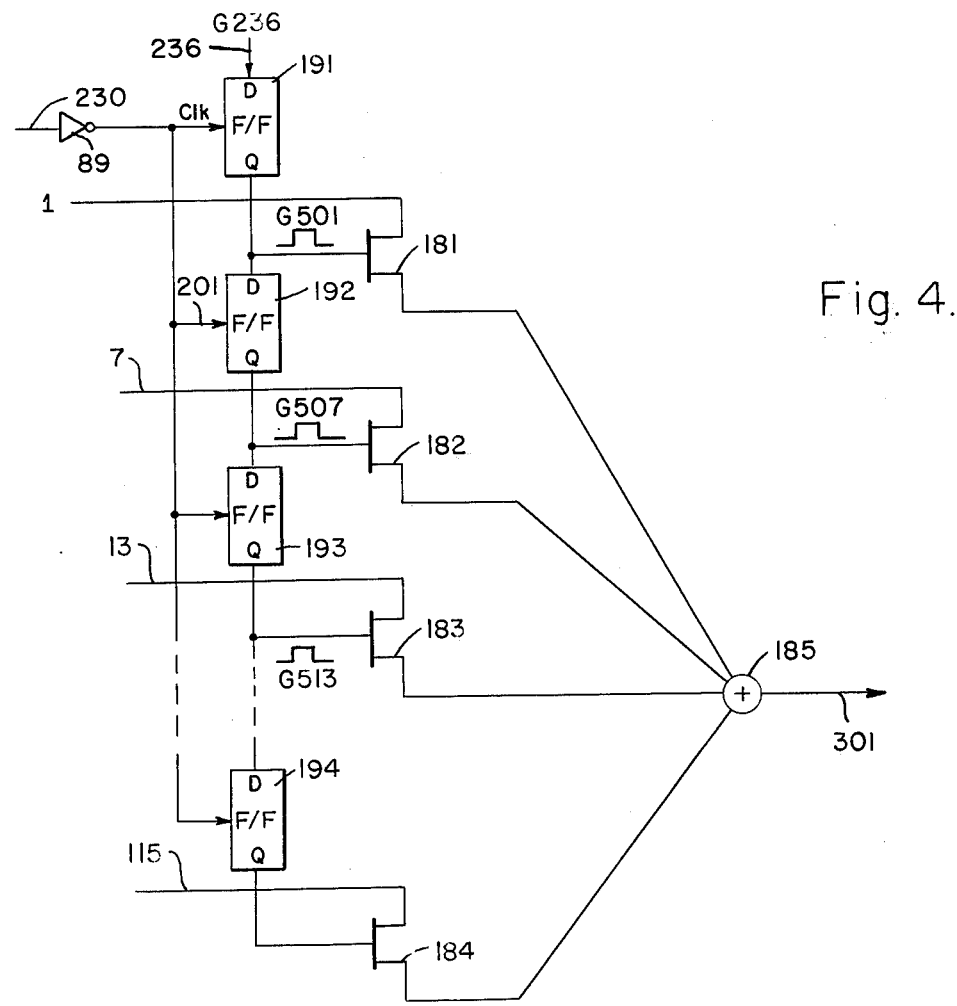
FIG. 4 is a block and circuit diagram of a representative slow multiplexer which may be utilized in conjunction with the present invention.

Referring to FIG. 4, a detailed slow multiplexer circuit which may be utilized to perform the multiplexing function of the slow multiplexer MX1 is illustrated. It will be appreciated, of course, that identical circuits may be utilized for the multiplexers MX2 through MX6. In the circuit shown, output channel 1 from the sample-and-hold circuit 150 is coupled to the input of a gate switch 181 which may be, for example, a metal oxide, n-channel semiconductor insulated gate field-effect transistor, or any other suitable switching device. The gate 181 is respectively turned on or off by the application or removal of the pulse of gate signal G501 to the base of the gate 181. The gate signal G501 may be generated by coupling interconnection 236 to the "set" terminal of clocked flip-flop 191 so that when gate enable signal G236 appears at the "set" terminal and clock signal G230 occurs, the flip-flop 191 will be set and switch 181 will be enabled or biased into conduction. When the gate 181 is turned on, the value of the analog signal held in the channel 1 sample-and-hold circuit will appear on an output lead 301. Because it is desired to have the analog signals on channels 1, 7, 13 . . . 115 appear sequentially on output channel 301, the gate enable signal G501 is also coupled to the set terminal of flip-flop 192 or any other clocked delay line to form gate signal G507 when clock G230 next occurs. At this time, flip-flop 191 is reset since enable signal G236 is not present when the second clock G230 appears thus causing gate signal G501 to go to zero so that the switch 181 is turned off. The gate signal G507 is coupled to the base of the gate 182 to thereby enable or turn on the gate 182 at some time later than when the gate 181 was turned on. The gate signal G507 is delayed again in the flip flop 193 whose output is coupled to the base of the switch 183 to thereby turn on the switch 183 at some time after the switches 181 and 182 have been turned on. This configuration is repeated twenty times, once for each of the channels being input to multiplexer MX1. The outputs of the twenty gates of multiplexer MX1 illustrated by the gates 181, 182, 183 and 184 are coupled to the summing junction 185 which may be a simple hard-wire connection to provide a single common output channel 301.

In the embodiment shown, the various delays illustrated by the flip-flops 191, 192, 193 and 194 each delay the gate signal G501 by a time equivalent to six fast multiplexer clock periods which corresponds to the time between when each first slow multiplexer clock G230 occurs.

In the illustrated embodiment, it will be appreciated that the flip flops are connected to operate on the trailing edge of the input signal and clock pulse in the conventional way and will be reset in response to a clock and the absence of the signal G236. One such flip flop which may be utilized is the Texas Instruments 5474 D-type flip flop where the clock signal is G230 inverted in inverter 89 (FIG. 4).

Thus, the gate 181 is first turned on and then turned off and the analog signal sample on channel 1 appears at the output channel 301. Six clock periods later, the gate 182 is first turned on and then off to provide a signal sample on the output 301 equivalent to the analog value of the signal held on channel 7. This sequence continues until all twenty channels have been sampled and appear sequentially on the common output channel 301. It will be appreciated that in order to output the signals from the multiplexer in proper sequence, the clock signals to the respective slow multiplexers will be delayed with respect to one another. This will be explained more fully subsequently.

Referring again to FIG. 1, the output channels 301, 302, 303, 304, 305 and 306 are coupled to a fast multiplexer MX7. The fast multiplexer MX7 is also coupled to the timing or clock leads 230, 231, 232, 233, 234 and 235 from the timing means 143 to supply the necessary gating signals to sequentially sample the output channels from the slow multiplex means to provide a sequence of 120 video samples on a single output lead 400.

Figure 5:
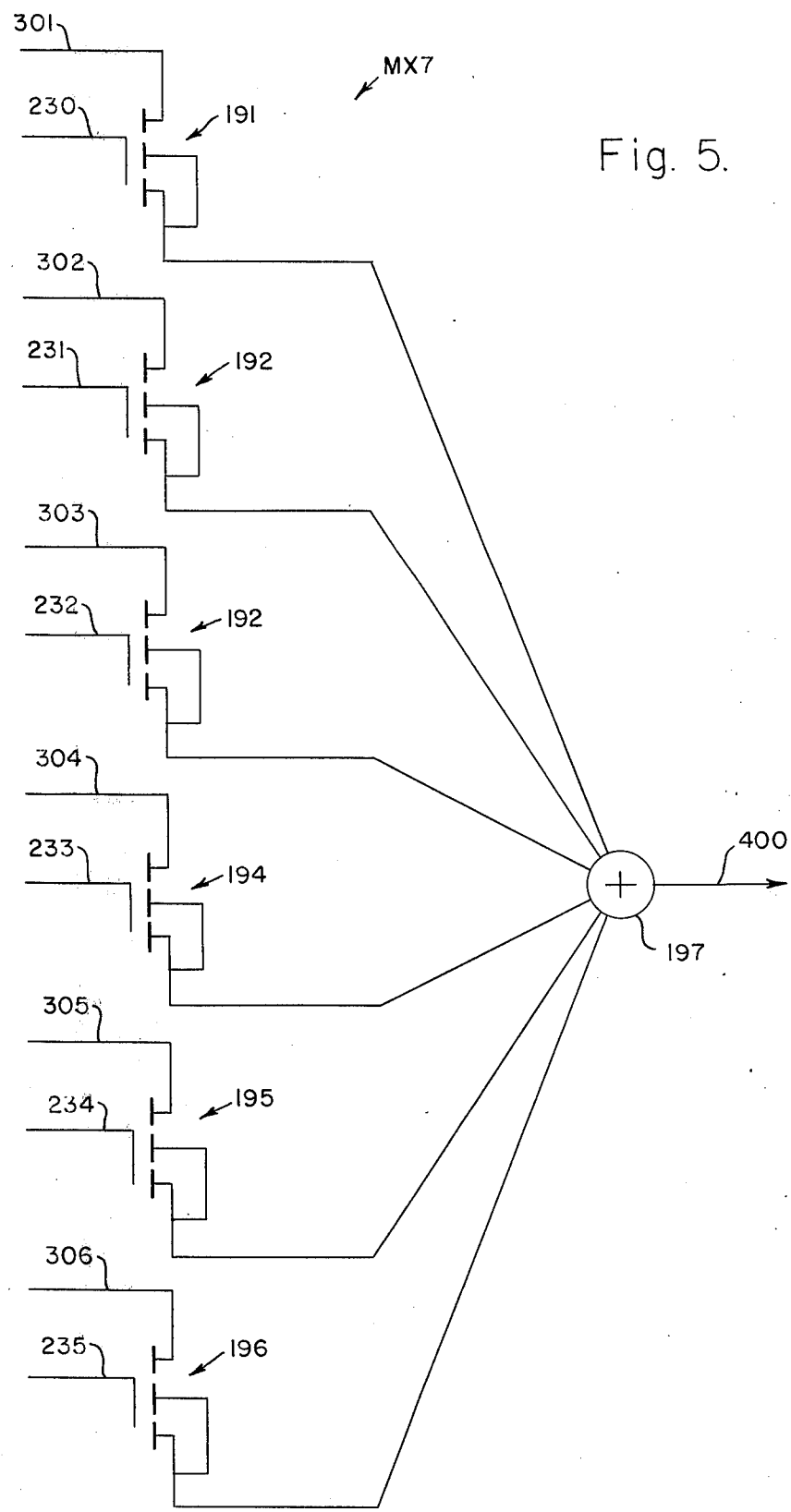
FIG. 5 is a circuit diagram illustrating the arrangement of high speed switches incorporated in the fast multiplexer.

Referring now to FIG. 5 which shows an illustrative circuit for the fast multiplex means, the input channels 301, 302, 303, 304, 305 and 306 are coupled to the input of six high-speed switches 191, 192, 193, 194, 195 and 196 respectively. The respective switches are then sequentially enabled by gate signals G230, G231, G232, G233, G234 and G235 sequentially applied to the base of the respective switches along six interconnections 230, 231, 232, 233, 234 and 235 respectively. The output terminals from the respective high-speed switches are coupled at a summing junction 197 to form a single output channel 400. The summing junction 197 may be a simple hard-wire connection. The high-speed switches may be silicon insulated field-effect transistors of the $n$-channel enhancement mode type such as the Signetics SB210 switches. It will be appreciated, however, that any other high-speed switches may be utilized which, for example, permit the generation of thirty pictures per second with 2,000 scan lines and 120 analog input signals per scan line. Such criteria requires switching rates on the order of 20 MHz for the high-speed switches.

Figure 2:
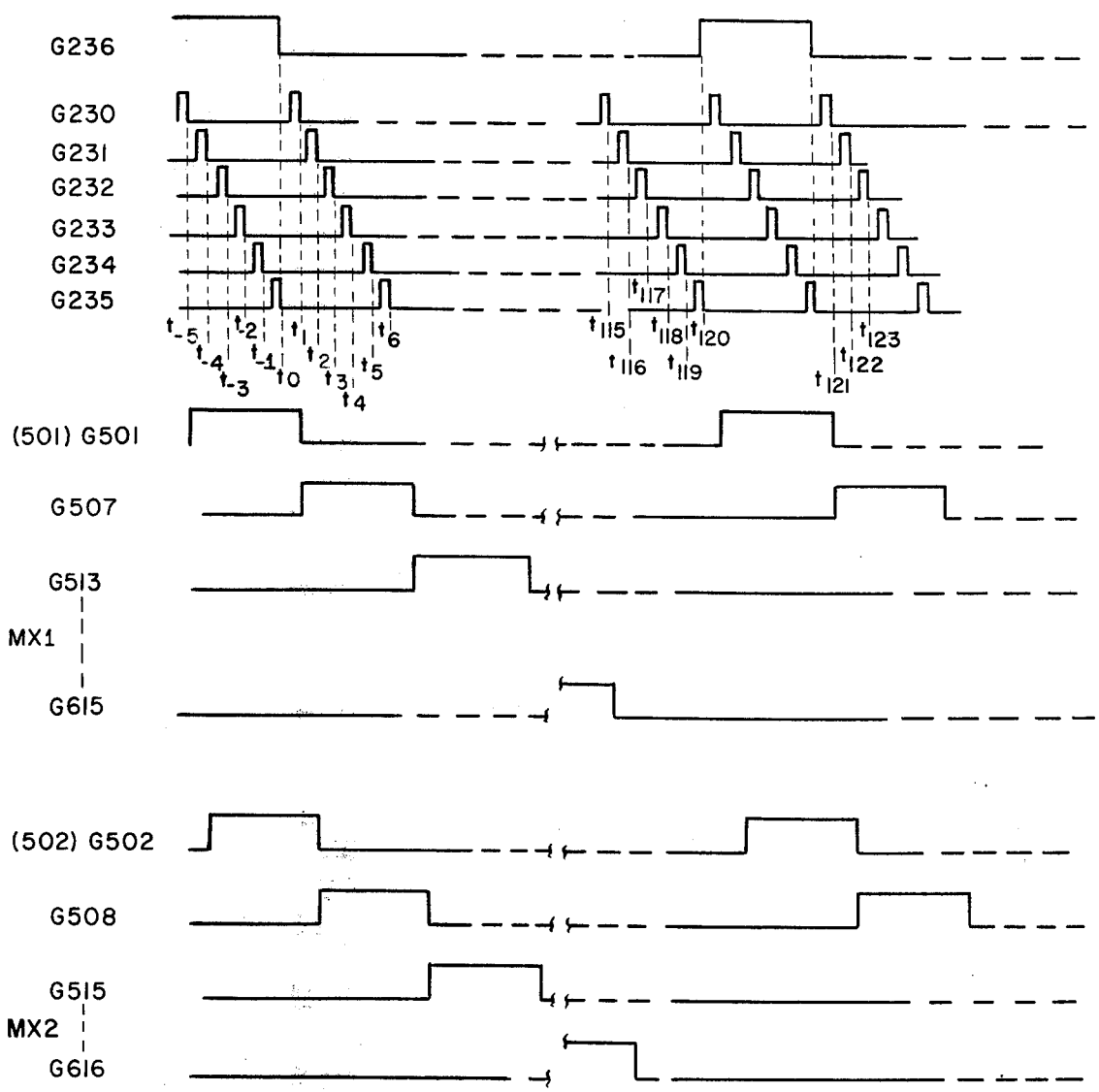
FIG. 2 shows a series of gate enable signals coupled to the various components shown in FIG. 1 for sequencing the analog video signals.
Figure 6:
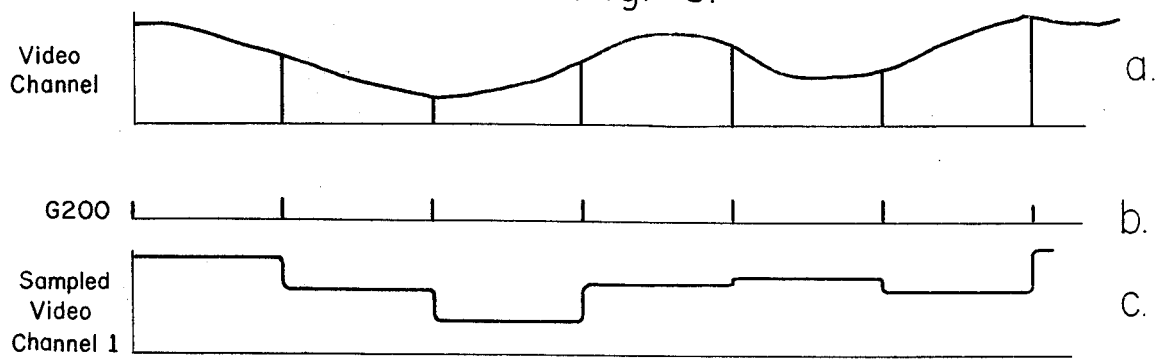
FIG. 6a is a plot representative of a typical video signal appearing on one of the 120 channels.
FIG. 6b is a typical gate signal defining the times when the video signal of FIG. 6a is to be sampled for a single vertical line of data from the scene being scanned, for example.
FIG. 6c is the resultant sampled video signal as observed at one channel of the sample-and-hold circuitry output.

The operation of the present multiplexer may be understood by reference to FIGS. 2 and 6 when viewed in conjunction with FIG. 1. Referring first to FIG. 6a, there is shown a representative video signal as it appears on any one of the 120 channels and may, for example, be representative of the video signal on channel 1. A gate signal G200 supplied to the sample-and-hold means 150 by the timing means 143 along interconnection 200, comprises a series of sampling pulses, as illustrated by FIG. 6b, which cause the gates shown in FIG. 3 to simultaneously turn on and cause the video signal from one channel to be sampled. The voltage of the sampled signal is then held constant until the next sample time or at least until all channels on the one line have been multiplexed. The resultant sampled video appearing at the output of the sample-and-hold means 140 on each of the 120 video channels will thus appear as a series of voltage levels similar to the sampled video signal from channel 1 shown in FIG. 6c.

Referring now to FIG. 2, the multiplexing sequence of the illustrative embodiments shown in FIG. 1 will be further described. The multiplexing sequence is commenced at time $t_{-5}$ when the signal G230 generated by the timing means 143 is supplied to the slow multiplexer MX1 and the fast multiplexer MX7 on interconnection 230. Note that in the present explanation, all switching occurs on the trailing edge of a gate signal. At the beginning of the sampling sequence, the enabling gate signal G236 which is on for six time periods from $t_{-5}$ through $t_1$, is coupled to the flip-flop 191 in the multiplexer MX1 along with the clock signal G230 to form a first gate signal G501. Thus, at time $t_{-5}$, the gate signal G236 appears at the "D" input and the clock G230 appears at the clock input of the flip-flop 191 to cause the flip-flop 191 to be set to generate the gate signal G501. The slow multiplex switch 181 is then turned on but this turn on time takes up to but no more than six fast multiplex time periods. Consequently, no output occurs from the fast multiplex switch 191, also clocked by the clock signal G230, even though it is sufficiently fast to be activated by the signal G230 because the single switch 181 will be sufficiently turned on only after the pulse at time $t_{-5}$ is gone. However, at time $t_1$, the clock signal G230 again occurs and now switch 181 is fully on, thus allowing information on the sample from channel 1 to pass through the slow multiplexer switch 181 and the fast multiplexer switch 191 to appear at the output 400.

The next gate signal to occur is G231 on interconnection 231. Since the information sampled and held on channel 2 has been chosen to be outputted at time $t_2$, the gate signal G231 occurs at time $t_{-4}$, along with the clock signal G231 to form the signal G502 to turn on the switch in MX2 corresponding to the switch 181 in the slow multiplexer MX1 so that at time $t_2$, the next time the clock signal G231 occurs, the appropriate switch in the second slow multiplexer MX2 will be on and the analog sample from channel 2 will pass through the second slow multiplexer MX2 to the fast multiplex gate 191, which is on in response to the gate signal G231, to the output 400.

The same sequence occurs for the third slow multiplexer MX3 to enable the signal on channel 3 to be transferred out at time $t_3$ by turning on the appropriate slow multiplex gate commencing at $t_{-3}$ so that a gate signal G232 occuring at time $t_3$ will cause the channel 3 analog sample to transfer through the third slow multiplexer MX3 and the switch 193 to the output 400. Similarly, channels 4, 5 and 6 coupled to the remaining slow multiplexers MX4, MX5 and MX6 are gated through the appropriate switches in the slow multiplexers commencing at times $t_{-2}$, $t_{-1}$ and $t_0$ by the appropriate gate signals G233, G234 and G235, respectively allowing the information from channels 4, 5 and 6 to be gated through the fast multiplexer MX7 at times $t_4$, $t_5$ and $t_6$; combined and sequentially output on the single output terminal 400.

In the timing sequence illustrated by FIG. 2, the gating signal G236 turns off just before time $t_1$. Referring momentarily to FIG. 4, the next gated channel whose information must be outputted at time $t_7$ along single output channel 400 is input channel 7. This requires that a gate 182 be turned on commencing at time $t_1$ so that the signal sample on the input channel 7 will pass through the switch 182 of the slow multiplexer MX1 at the time $t_7$ when the next enable clock G230 enables the switch 191 in the fast multiplexer MX7. This result may be obtained by setting a flip-flop 192 with a gate signal G501 when the clock G230 occurs at $t_1$ so that the switch 182 will have time to turn on by time $t_7$ when the next clock signal G230 enables the fast multiplexer switch 191.

The same process occurs to enable channel 8 to be outputted by setting a flip-flop at time $t_2$ with the gate signal G502 and the clock G231 to form a gate signal G508, which enables the appropriate gate in the slow multiplexer MX2 at time $t_8$. This occurs when the gate 192 in the fast multiplexer MX7 is enabled by signal G231 at time $t_8$ to cause the analog sample on channel 8 to appear on the output 400.

This sequence continues until each of the 120 input channels are sequentially sampled and outputted in serial form on the fast multiplexer single output channel 400. Once all 120 analog input signals have been sampled and outputted on the output channel 400, the sequence begins again at time $t_{121}$ when the enabling gate G236 again turns on and the first sequence of gate signals G501 through G506 is again formed. It will be appreciated that a time span, between the clock time $t_{120}$ and $t_{121}$ which is longer than just one clock period may be incorporated and may be necessary in some applications to allow for resetting and initialization of other timing and display circuitry.

While the above-described timing has been illustrated utilizing enabling gates 236, and various clocked delay shift registers illustrated by flip-flops 191, 192, 193 and 194 in FIG. 4, it will also be appreciated that numerous other techniques for generating the necessary timing signals may be incorporated without departing from the spirit of the present invention so long as the appropriate slow multiplexer gate is in the "on" state when the corresponding fast multiplexer gate is clocked so that the desired sequence of output signals will be obtained on channel 400.

It will be appreciated that various other implementations and arrangements to practice the present invention may also be possible without departing from the spirit and scope of the present invention as described herein.

What is claimed is:

1. A multiplexing circuit for responding to a plurality of applied-in-parallel analog input signals to produce a serial output signal which is indicative of the simultaneously sampled value of each of said analog input signals, said circuit comprising:
   (a) sample-and-hold means responsive to sampling enable signals for periodically sampling all of the analog input signals simultaneously and holding each resultant sample value on a sample-and-hold means output channel;
   (b) first multiplex means comprising a first group of multiplexers each having a plurality of input channels coupled to a mutually exclusive subset of sample-and-hold means output channels and a single multiplexer output channel, each multiplexer of said first group including gating means, which responds to gating signals, for sequentially gating therethrough the resulting signal samples on said subset of sample-and-hold means output channels to said single multiplexer output channel so as to form a first serial signal;
   (c) second multiplex means having a plurality of input channels each coupled to a different one of said output channels of said first group of multiplexers and including a plurality of gating means, which respond to gating signals, for intermittently and sequentially gating therethrough the plurality of first serial signals from the first group of multiplexers so as to form a second serial signal which comprises a defined sequence of signal samples from said input channels; and
   (d) timing means for providing said gating signals and said sampling enable signals which are so timed relative to one another that all of said resultant sample values are held until each resultant sample value has been gated through said first and second multiplex means to form said second serial output signal.

2. The multiplexing circuit of claim 1 wherein said sample-and-hold means comprises a plurality of sample-and-hold circuits, one for each of said applied analog input signals, each of said sample-and-hold circuits comprising a switch having an input terminal coupled to receive one of the analog input signals, a capacitor coupled between ground and the output terminal of said switch and an amplifier coupled between the output channel of said sample-and-hold circuit and the output terminal of said switch and wherein the control terminals of said plurality of switches are coupled in parallel to receive said sampling enable signals from said timing means.

3. A multiplexing circuit for converting a plurality of analog input signals to a single serial signal comprising:
  (a) sample-and-hold means for simultaneously sampling each of said plurality of analog input signals at defined sample times and for generating a plurality of sample output signals each having a value proportional to the value of the corresponding analog input signal at the most recent sample time;
  (b) first multiplex means for receiving said plurality of sample output signals and sequentially gating said sampled output signals so as to form at least two gated signals each comprising a series of analog pulses, each pulse being derived from and indicative of one of said parallel analog signals; and
  (c) second multiplex means for receiving said gated signals from said first multiplex means and for sequentially gating individual analog pulses therefrom to form a serial signal comprising sequences of analog pulses wherein each pulse corresponds to and is indicative of one of said parallel analog signals.

* * * * *